Patented Apr. 29, 1930

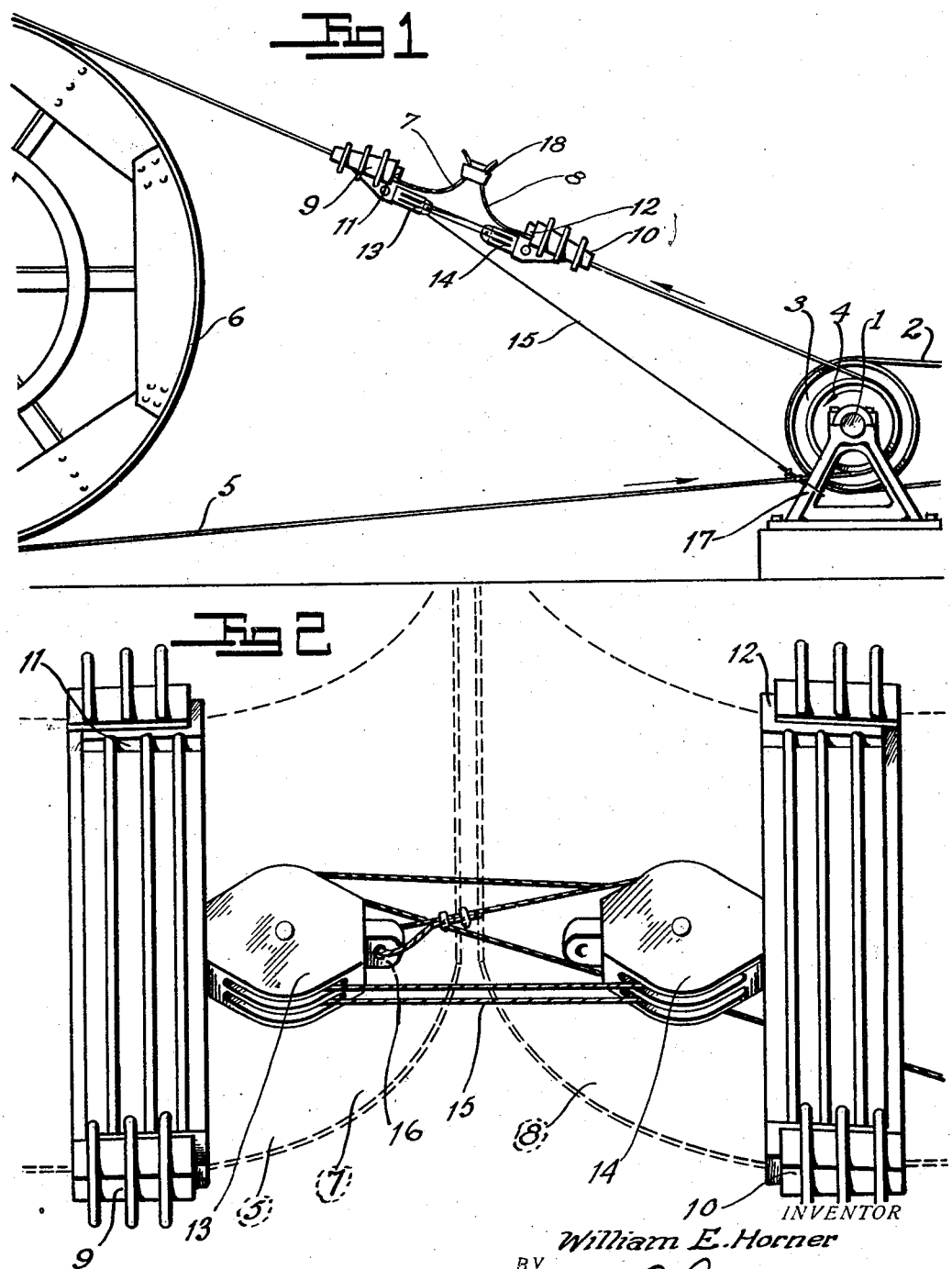

1,756,557

UNITED STATES PATENT OFFICE

WILLIAM E. HORNER, OF RANGER, TEXAS, ASSIGNOR TO LORY J. MILDREN, OF PONCA CITY, OKLAHOMA

BELT TIGHTENER

Application filed January 8, 1929. Serial No. 331,142.

This invention relates to a method of and apparatus for stretching belts and particularly to belts of heavy power machinery such as are used for driving the band wheel of an oil well rig, although it is not necessarily limited to any particular use. In carrying out the invention, I utilize power of the drive pulley of the motor or a power transmitting pulley to stretch the belt or tighten it so that the belt clamp or fastener may secure the two ends of the belt together.

It will readily be appreciated that considerable power is required to tighten or stretch a relatively wide and long belt which in itself has considerable weight so any method which will mechanically handle the belt, during the tightening and stretching operation and the clamping of the ends, is a material advantage over the usual method of manually handling the same. In carrying out my invention, I utilize a rope or cable which passes through pulley blocks or sheaves connected to two complementary members of the belt tightener, these in turn being fastened to the ends of the belt. One end of the cable or rope is fastened to one of the pulley blocks and the other end to an anchor, preferably a part of the machine, it being understood that the belt is on the power pulley and on the pulley or wheel to which power is to be communicated. Then, when the power pulley is turned, the belt tightener clamps move away from the anchor to draw the two blocks together and consequently bring the two clamps of the belt tightener together so that the ends of the belt may be clamped together by an appropriate belt fastener or coupler. The particular form of coupler, in so far as the present invention is concerned, forms no part of my invention.

In order to understand the invention, reference should be had to the following description in connection with the accompanying drawings in which:

Fig. 1 is a side elevational view of a belt, a power wheel, a band wheel, the belt tightener and the clamp or coupler, and Fig. 2 is a plan view of the clamps of the belt tightener, the pulley block and the cable, the belt ends being shown in dotted lines.

Referring now to the drawings by numerals of reference, 1 designates the power shaft from which the power is transmitted. It is shown as driven by a belt 2 to the medium of the pulley 3. A power transmitting pulley 4 drives the belt 5 to turn the band wheel 6. Near the two ends 7 and 8 of the belt 5 are the tightener clamps consisting of the grooved members 9 and 10 and the wedge members 11 and 12 between which the ends of the belt may be clamped in a well understood manner. The member 9 carries a pulley block 13 and a similar pulley block 14 is carried by the member 10. A cable 15 has one end secured to a lug on one of the pulley blocks, in the present instance 16 on the pulley block 13. The cable passes around the pulleys in the pulley block and has one end secured to an anchor 17, in the present instance, the standard for the bearing of shaft 1. As the shaft 1 is rotated in the direction of the arrow in Figure 1, the two clamps will be moved away from the anchor during the travel of the belt 5 so that the cable between the blocks 13 and 14 will be shortened, drawing the two clamps together and thereby draw the free ends of the belt together so that the belt clamp or coupler 18 may be applied. Then, the wedges 11 and 12 are removed and the two clamping members, together with the blocks, are removed from the belt.

It will, therefore, be apparent that the belt can be handled by the power of the engine or motor in a convenient and expeditious manner, thus, saving time whenever it is necessary to tighten the belt to apply the clamp 18. The clamp, of course, may be of any conventional construction, for example, such as is illustrated in the patent to William E. Horner, No. 1,588,368, dated June 8, 1926.

What I claim and desire to secure by Letters Patent is:—

1. The herein described method of tightening belts supported by a power pulley and a driven pulley which consists in clamping the two ends of the belt, fastening one end of a rope or cable to one of the clamps, passing it back and forth through the pulleys carried by the clamps, fastening the other end of the rope or cable to an anchor and utilizing the power pulley to cause the belt to travel in a direction to move the clamps away from the anchor to thereby draw the clamps together by the tension of the anchored portion of the rope or cable so that the two ends of the belt will be in position to be clamped together.

2. The herein described method of tightening belts supported by a power pulley and a driven pulley which consists in clamping the two ends of the belt, fastening one end of a rope or cable to one of the clamps, passing it back and forth through the pulleys carried by the clamps, fastening the other end of the rope or cable to an anchor, utilizing the power pulley to cause the belt to travel in a direction to move the clamps away from the anchor to thereby draw the clamps together by the tension of the anchored portion of the rope or cable so that the two ends of the belt will be in position to be clamped together and coupling the two ends of the belt.

3. The herein described method of tightening belts supported by a power pulley and a driven pulley which consists in fastening pulleys to the ends of the belt, fastening one end of a rope or cable to one of the pulleys, passing the rope or cable back and forth through the pulleys, fastening one end of the rope or cable to an anchor and utilizing the power pulley to communicate travel to the belt to cause the pulleys to move away from the anchor so that the tension on the anchored portion of the rope or cable will cause a multiplying action of the rope or cable through the pulleys to draw them together to bring the free ends of the belt into position for coupling.

4. The herein described method of tightening belts supported by a power pulley and a driven pulley which consists in fastening pulleys to the ends of the belt, fastening one end of a rope or cable to one of the pulleys, passing the rope or cable back and forth through the pulleys, fastening one end of the rope or cable to an anchor adjacent to the power pulley and utilizing the power pulley to communicate travel to the belt to cause the pulleys to move away from the anchor so that the tension on the anchored portion of the rope or cable will cause a multiplying action of the rope or cable through the pulleys to draw them together to bring the free ends of the belt into position for coupling.

5. A mechanism for tightening belts comprising a power pulley and a driven pulley supporting the belt, pulley blocks fastened to the respective ends of the belt and a cable having one end fastened to one of the blocks and the other end to an anchor adjacent to the power pulley, the part of the cable adjacent to the pulleys being passed back and forth through the pulleys whereby when the power pulley is rotated in one direction, the pulleys carried by the ends of the belt will be moved away from the power pulley to put tension on the anchored portion of the cable to draw the pulleys carried by the ends of the belt one toward the other and means for coupling the two ends of the belt.

In testimony whereof I affix my signature.

WILLIAM E. HORNER.